US012739140B2

(12) United States Patent
Allen et al.

(10) Patent No.: US 12,739,140 B2
(45) Date of Patent: Sep. 15, 2026

(54) AUTOMATED PRIVACY CONTROLS FOR A SCHEDULE VIEW OF A SHARED CONFERENCE SPACE DIGITAL CALENDAR

(71) Applicant: Zoom Communications, Inc., San Jose, CA (US)

(72) Inventors: Reed Hunter Allen, Medford, OR (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 268 days.

(21) Appl. No.: 17/971,017

(22) Filed: Oct. 21, 2022

(65) Prior Publication Data

US 2024/0137235 A1 Apr. 25, 2024
US 2024/0235867 A9 Jul. 11, 2024

(51) Int. Cl.
*H04L 12/18* (2006.01)
*G06F 21/32* (2013.01)
*G06F 21/62* (2013.01)

(52) U.S. Cl.
CPC .......... *H04L 12/1818* (2013.01); *G06F 21/32* (2013.01); *G06F 21/629* (2013.01); *G06F 2221/2141* (2013.01)

(58) Field of Classification Search
CPC ... H04L 12/1818; G06F 21/32; G06F 21/629; G06F 2221/2141
See application file for complete search history.

(56) References Cited

U.S. PATENT DOCUMENTS 8,744,142 B2 * 6/2014 Murakami ............ G06F 3/0488 382/116
9,100,694 B1 * 8/2015 Chandel ............. H04N 21/4661
10,200,333 B1 2/2019 Lei
2004/0103147 A1 * 5/2004 Flesher ............... G06F 16/1767 707/999.009
2015/0181020 A1 6/2015 Fitzsimmons et al.
2018/0101142 A1 * 4/2018 Dudhat .................... G04G 9/02
2018/0292907 A1 * 10/2018 Katz ....................... G06F 3/017
2018/0293954 A1 * 10/2018 Wang ...................... G06F 3/013
2019/0124387 A1 * 4/2019 Baron ..................... G06F 3/147
2019/0346999 A1 * 11/2019 Yuan .................. G06Q 10/1093
2020/0159948 A1 * 5/2020 Sun ....................... G06F 3/1454
2020/0351265 A1 11/2020 Srinath et al.
(Continued)

OTHER PUBLICATIONS

Anticipated Schaub, Florian "PriCal: Dynamic Privacy Adaptation of Collaborative Calendar Displays", Sep. 2013 (Year: 2013).*
(Continued)

*Primary Examiner* — Farid Homayounmehr
*Assistant Examiner* — Judy Bazna

(57) ABSTRACT

A conference schedule system that implements automated privacy controls for a schedule view of a shared conference space digital calendar. The conference schedule system determines an identity of a person viewing a display screen configured to display a schedule view of a digital calendar associated with a shared conference space, accesses event permissions associated with an event schedule for the shared conference space, and modifies a selective output of information associated with the event in the schedule view displayed at the display screen based on the event permissions and the identity of the person.

20 Claims, 14 Drawing Sheets

(56) References Cited

U.S. PATENT DOCUMENTS

| | | | | |
|---|---|---|---|---|
| 2021/0399911 | A1 | 12/2021 | Jorasch et al. | |
| 2022/0207490 | A1 | 6/2022 | Yoshizawa et al. | |
| 2022/0353465 | A1 * | 11/2022 | Smith | H04N 7/142 |
| 2023/0368092 | A1 * | 11/2023 | Fardig | G06Q 10/06312 |

OTHER PUBLICATIONS

Schaub, Florian "PriCal: Dynamic Privacy Adaptation of Collaborative Calendar Displays", Sep. 2013 (Year: 2013).*

* cited by examiner 604
606
606
606
606
610
610
610
610
602
600

800

802

| SHARED CONFERENCE SPACE | EVENT NAME 806 | EVENT DESCRIPTION 808 | PARTICIPANTS 810 |
| --- | --- | --- | --- |
| FIRST TIME BLOCK 804A | IN USE | | |
| SECOND TIME BLOCK 804B | WELCOME TO THE TEAM 812B | | |
| THIRD TIME BLOCK 804C | HAPPY BIRTHDAY 812C | BIRTHDAY CELEBRATION FOR TEAM MEMBERS HAVING A BIRTHDAY THIS MONTH 814C | ALL EMPLOYEES 816C |
| FOURTH TIME BLOCK 804D | HR MEETING 812D | | HR MANAGER<br>OPERATIONS MANAGER<br>FINANCE MANAGER 816D |

| SHARED CONFERENCE SPACE | EVENT NAME 806 | EVENT DESCRIPTION 808 | PARTICIPANTS 810 |
| --- | --- | --- | --- |
| FIRST TIME BLOCK 804A | IN USE | | |
| SECOND TIME BLOCK 804B | WELCOME TO THE TEAM 812B | INTRODUCTION OF NEW TEAM MEMBERS 814B | |
| THIRD TIME BLOCK 804C | HAPPY BIRTHDAY 812C | BIRTHDAY CELEBRATION FOR TEAM MEMBERS HAVING A BIRTHDAY THIS MONTH 814C | ALL EMPLOYEES 816C |
| FOURTH TIME BLOCK 804D | HR MEETING 812D | 814D | HR MANAGER<br>OPERATIONS MANAGER<br>FINANCE MANAGER 816D |

| SHARED CONFERENCE SPACE | EVENT NAME 806 | EVENT DESCRIPTION 808 | PARTICIPANTS 810 |
| --- | --- | --- | --- |
| FIRST TIME BLOCK 804A | IN USE | | |
| SECOND TIME BLOCK 804B | WELCOME TO THE TEAM 812B | INTRODUCTION OF NEW TEAM MEMBERS 814B | FIRST EMPLOYEE<br>SECOND EMPLOYEE<br>THIRD EMPLOYEE 816B |
| THIRD TIME BLOCK 804C | HAPPY BIRTHDAY 812C | BIRTHDAY CELEBRATION FOR TEAM MEMBERS HAVING A BIRTHDAY THIS MONTH 814C | ALL EMPLOYEES 816C |
| FOURTH TIME BLOCK 804D | HR MEETING 812D | DISCUSS STAFFING SHORTAGES 814D | HR MANAGER<br>OPERATIONS MANAGER<br>FINANCE MANAGER 816D |

| SHARED CONFERENCE SPACE | EVENT NAME 806 | EVENT DESCRIPTION 808 | PARTICIPANTS 810 |
| --- | --- | --- | --- |
| FIRST TIME BLOCK 804A | BUSINESS STRATEGY MEETING 812A | DISCUSSION OF POTENTIAL ACQUISITION OF COMPANY BY BIG COMPANY 814A | |
| SECOND TIME BLOCK 804B | IN USE | | |
| THIRD TIME BLOCK 804C | IN USE | | |
| FOURTH TIME BLOCK 804D | IN USE | | |

| SHARED CONFERENCE SPACE | EVENT NAME 806 | EVENT DESCRIPTION 808 | PARTICIPANTS 810 |
|---|---|---|---|
| FIRST TIME BLOCK 804A | BUSINESS STRATEGY MEETING 812A | DISCUSSION OF POTENTIAL ACQUISITION OF COMPANY BY BIG COMPANY 814A | FIRST EXECUTIVE<br>SECOND EXECUTIVE<br>THIRD EXECUTIVE 816A |
| SECOND TIME BLOCK 804B | WELCOME TO THE TEAM 812B | INTRODUCTION OF NEW TEAM MEMBERS 814B | FIRST EMPLOYEE<br>SECOND EMPLOYEE<br>THIRD EMPLOYEE 816B |
| THIRD TIME BLOCK 804C | HAPPY BIRTHDAY 812C | BIRTHDAY CELEBRATION FOR TEAM MEMBERS HAVING A BIRTHDAY THIS MONTH 814C | ALL EMPLOYEES 816C |
| FOURTH TIME BLOCK 804D | HR MEETING 812D | DISCUSS STAFFING SHORTAGES 814D | HR MANAGER<br>OPERATIONS MANAGER<br>FINANCE MANAGER 816D |

FIG. 12

AUTOMATED PRIVACY CONTROLS FOR A SCHEDULE VIEW OF A SHARED CONFERENCE SPACE DIGITAL CALENDAR

FIELD

This disclosure relates generally to shared conference space scheduling, and more specifically, to automated privacy controls for a schedule view of a shared conference space digital calendar.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 8-12 are illustrations of examples of schedule views of a shared conference space digital calendar having automated privacy controls.

DETAILED DESCRIPTION

Figure 1:
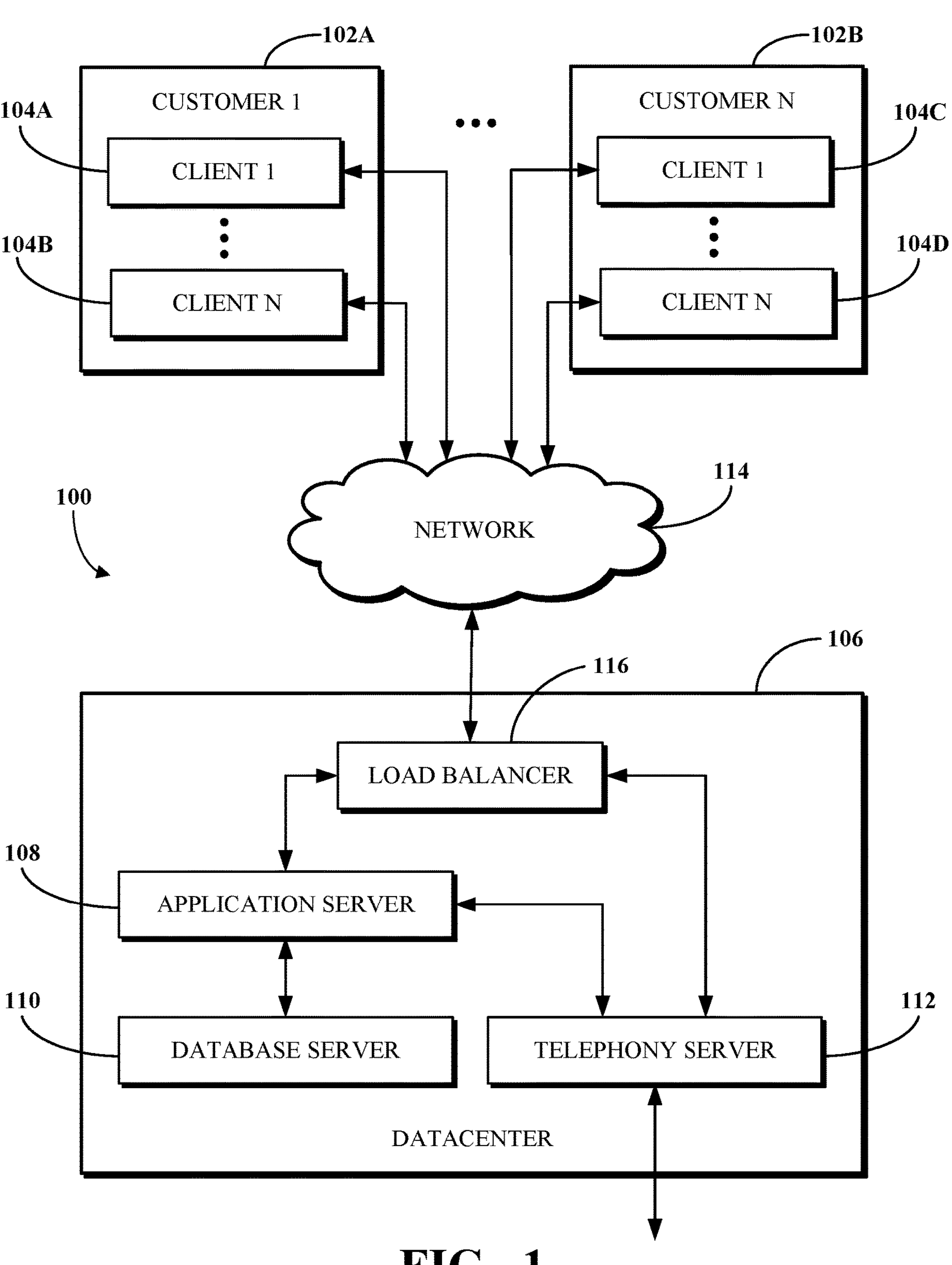
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

One particular example of such a communications service, which may be implemented using a UCaaS platform or otherwise, is a conferencing service that uses conferencing software. Conventional video conferencing software, such as that implemented by a UCaaS or other software platform, can be extended to provide hybrid conferences, combining remote conference participants with in-person conference participants located in physical spaces, such as shared conference space. A shared conference space, such as a conference room located in an office, is a physical space configured for hosting one or more in-person participants of a conference, such as a conference facilitated using video conferencing software. Shared conference spaces can, in many cases, be reserved by individuals or groups of people to ensure conferences attended by the people in those rooms remain private. To accommodate reservations or other general use, a shared conference space can have an associated shared conference space digital calendar to track the availability of the shared conference space. The shared conference space digital calendar is a data structure that indicates the times that the shared conference space is or is expected to be in use. The shared conference space digital calendar can include other information such as names and descriptions of scheduled events in the shared conference space, identities of people invited to participate in a video conference from the shared conference space, a record of people who actually attended the conference in the shared conference space, permissions for visibility of conference information, and other information related to the shared conference space.

A shared conference space can have an associated display that displays a schedule view of the shared conference space digital calendar. The schedule view is a visual representation of a portion of the shared conference space digital calendar with event information arranged to communicate times that events are occurring in the shared conference space and other information about an event. The associated display can be located within the shared conference space or located external to the shared conference space. In some instances, there can be multiple associated displays located in different locations (e.g., all within the shared conference space, all external to the shared conference space, or one or more within and one or more external to the shared conference space).

In some instances, an event organizer may not want a description of an event to be displayed for everyone to see. For example, an event organizer scheduling a surprise party in a conference space would not want to broadcast to everyone that a surprise party is taking place, which risks the person being surprised finding out ahead of time. Or, in another example, an event related to a sensitive business topic such as a sale of a company should not have an event description displayed for everyone to see, as it could otherwise risk exposure of such sensitive information to persons who should not have it. However, in conventional conference schedule systems, event information is either private or public based on an event organizer's selection at the time the shared conference space is reserved. Conventional conference schedule systems thus lack fine-grained permissions for displaying event information in a schedule view, leading to situations where either too much information is displayed, or not enough information is displayed.

Implementations of this disclosure address problems such as these using a conference schedule system that implements automated privacy controls for a schedule view of a shared conference space digital calendar. The conference schedule system dynamically updates the schedule view dependent on an identity of a person viewing the display of the schedule view. In some instances, no other interaction is required on the part of the person viewing the schedule view, as the conference schedule system automatically determines the person's identity and updates the schedule view to account for the identity of the person and permissions associated with events. Thus, an event organizer can choose what information should be displayed to specific people or groups of people and the conference schedule system dynamically updates the schedule view that is displayed by the conference schedule system so that the specific people or groups of people are shown the appropriate amount of information based on the choice of the event organizer.

The conference schedule system includes a display screen configured to display the schedule view, a sensor device configured to capture identifying information of a person viewing the display screen, and a control system to update the schedule view displayed at the display screen based on the viewer identifying information. The conference schedule system detects that a person is viewing the display screen, determines an identity of the person viewing the display screen, accesses permissions associated with the shared conference space digital calendar, and outputs a schedule view of the shared conference space digital calendar for displaying on the display screen in dependence on the permissions and the person's identity.

The conference schedule system enables fine-grained permissions for the schedule view based on the identity of a person viewing the display. The permissions can be tailored to the person viewing the display and the event scheduled in the shared conference space. The permissions may restrict the schedule view from displaying too much information about a scheduled event for some people while displaying additional information about the scheduled event for other people. Thus, each person may be able to observe a personalized amount of information about the event scheduled in the shared conference space based on the person's identity and permissions set by the event creator.

To describe some implementations in greater detail, reference is first made to examples of hardware and software structures used to implement a conference schedule system with automated privacy controls for a schedule view of a shared conference space digital calendar. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or a combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106, as generally illustrated, includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs the same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs the same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
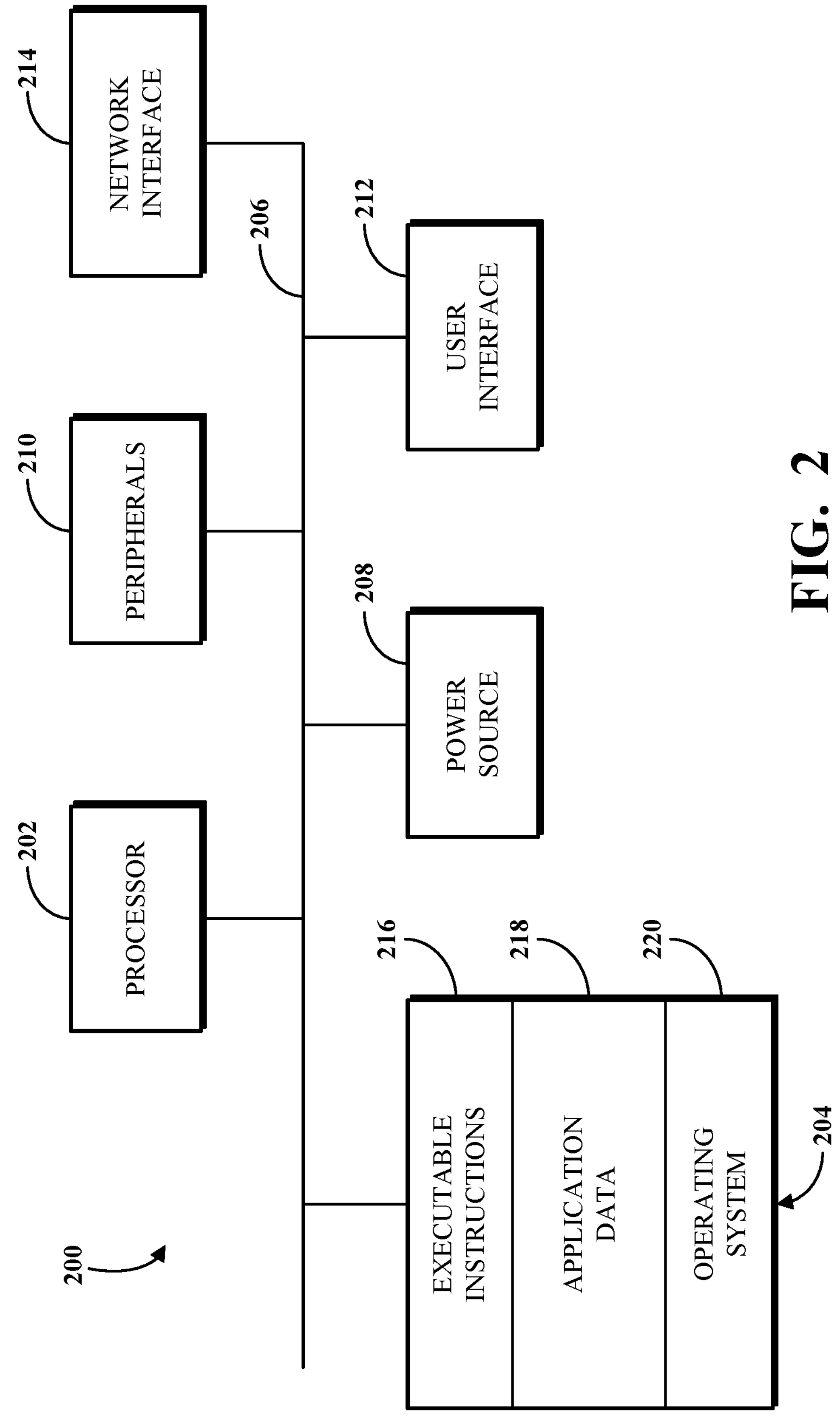
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 include one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light-emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
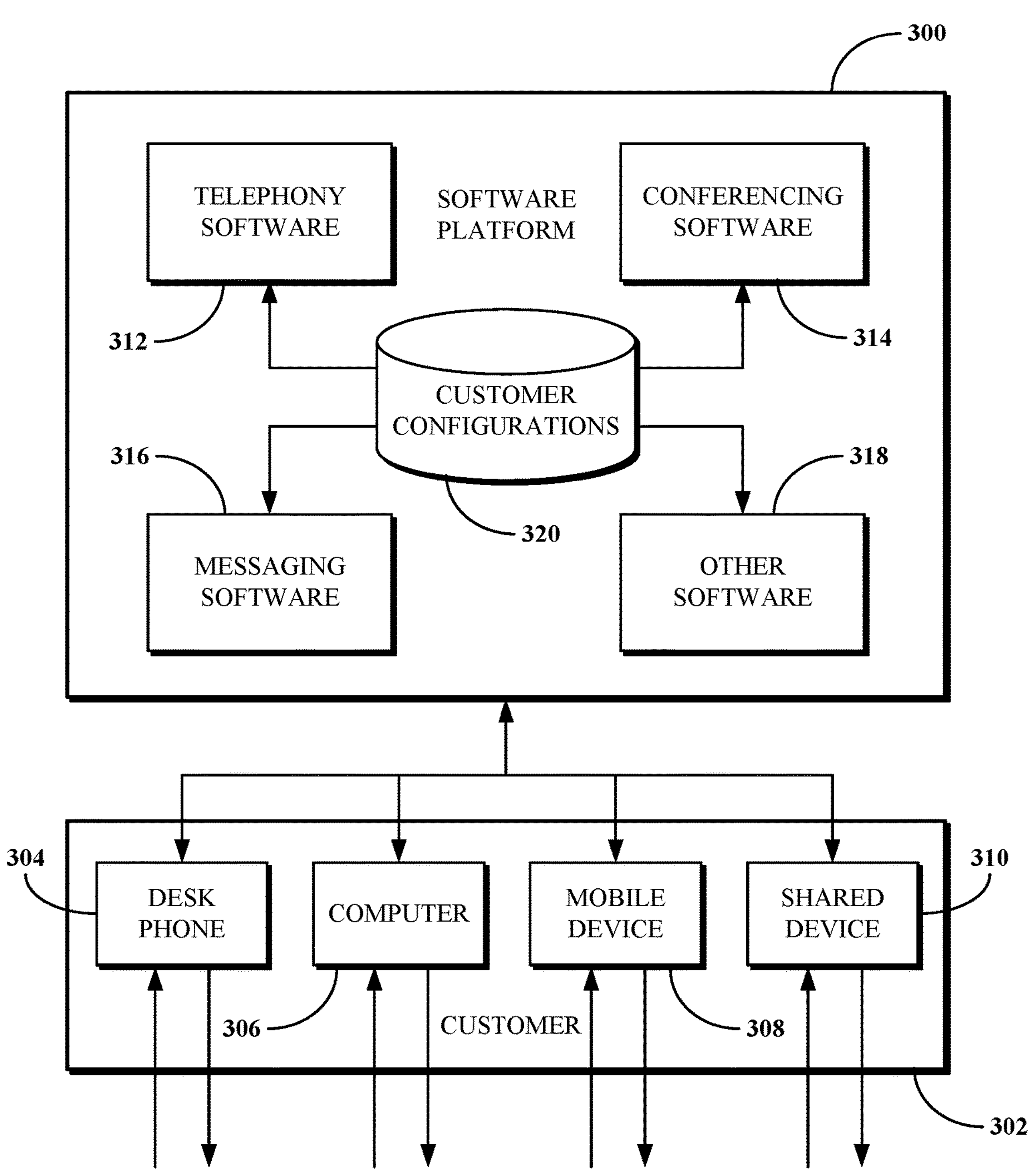
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, as shown, includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer, including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for setting privacy permissions and related controls, digital calendaring, and/or image processing (e.g., for user identification via facial recognition).

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
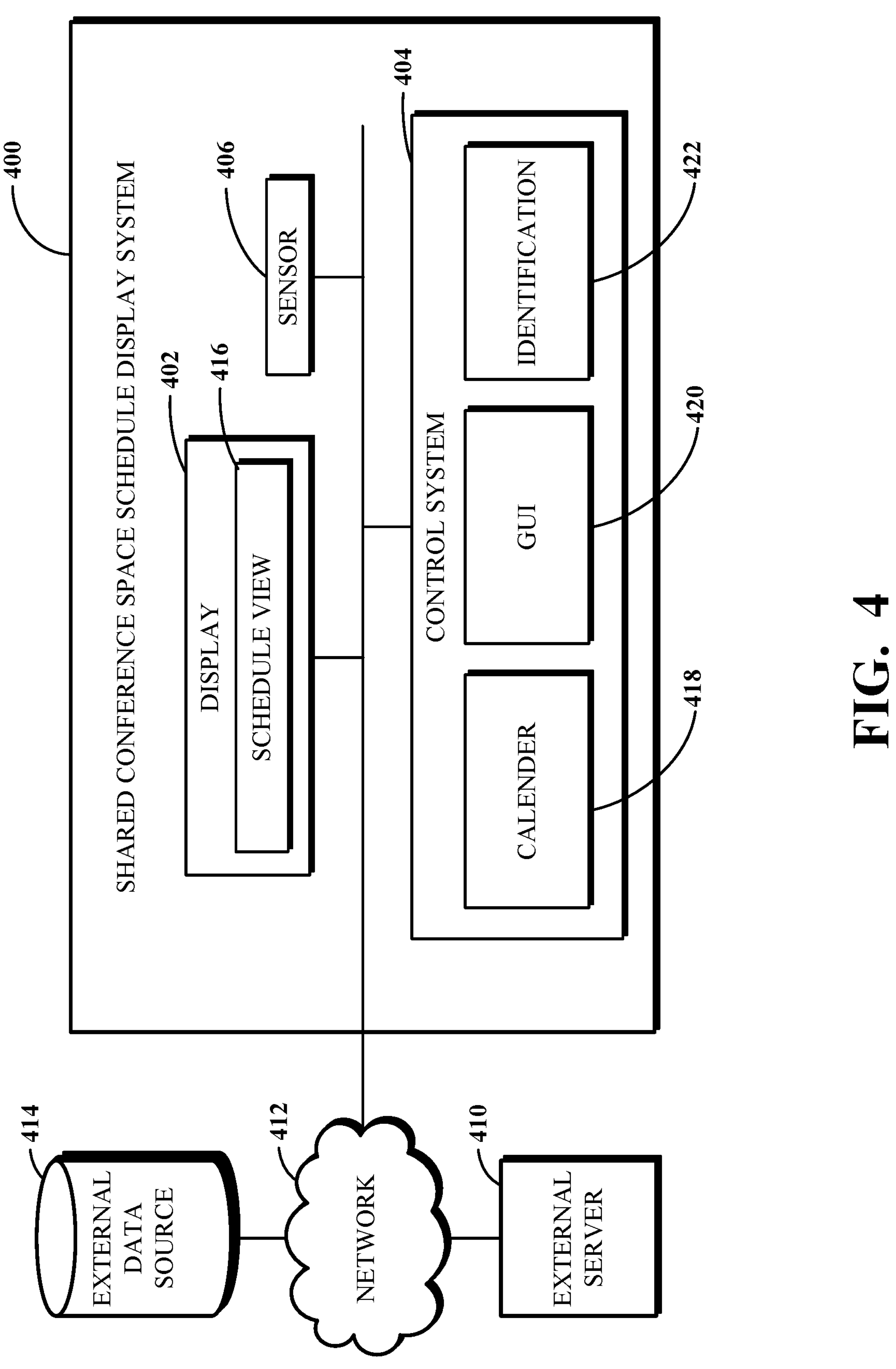
FIG. 4 is a block diagram of an example of a conference schedule system for implementing automated privacy controls for a schedule view of a shared conference space digital calendar.

FIG. 4 is a block diagram of an example of a conference schedule system 400 implementing automated privacy controls for a schedule view of a shared conference space digital calendar. As shown, the conference schedule system 400 includes a display component 402, a control system component 404, and a sensor component 406. The display component 402 is configured to display a selective output of event information in a schedule view 416 of the shared conference space digital calendar. The selective output of event information in the schedule view 416 is dynamically modified by the conference schedule system 400 dependent on a person viewing the display component 402. The control system component 404 is configured to control the operation of the conference schedule system 400 and is implemented by a computing device, for example, the computing device 200 of FIG. 2. The sensor component 406 is configured to detect a characteristic of a person viewing the display component and generate identifying data that is used by the conference schedule system 400 to identify the person viewing the display device. In some implementations, the display component 402, the control system component 404, and the sensor component 406 are integrated in a single chassis, while in other implementations at least one of the display component 402, the control system component 404, or the sensor component 406 are discrete components located remotely from the other such components.

Examples of display components 402 include, but are not limited to, cathode-ray tube (CRT) displays, liquid crystal displays (LCDs), organic light-emitting diode (OLED) displays, liquid ink displays, and the like. The schedule view 416 displayed at the display component 402 includes schedule information for the shared conference space, such as time blocks and dynamic event information for events scheduled during each time block. The dynamic event information can include information such as an event name, event description, event participants, remote access information, and other information. As will be described later, the conference schedule system 400 dynamically updates the event information of the schedule view 416 in response to the identity of a person or group of persons viewing the display component 402.

Throughout the present disclosure, reference will be made to a person viewing the display component 402. In some implementations, a person viewing the display component 402 refers to any person that has the output of the display component 402 in their field of view. In some implementations, a field of view refers broadly to the area in front of the person in which the person is able to discern textual information output at the display component 402. Thus, a person viewing the display component refers to a person orientated facing the display component and that could read text output at the display component 402 regardless of whether the person has their gaze affixed to the output of the display component 402.

The sensor component 406 is configured to capture identifying information of a person viewing the display component, which information is usable by the conference schedule system 400 to identity the person. The sensor component 406 includes a sensor, group of sensors, or an interface for communicating with an external sensor. The sensor component 406 is operable to generate identifying information for the person viewing the display component 402 based on a characteristic of the person as sensed by a sensor. In some implementations, the sensor component 406 includes an image sensor operable to generate identifying information based on an optical characteristic of the person, an audio sensor operable to generate potential viewer identifying information based on an audio characteristic of the person, a Near Field Communication (NFC) sensor operable to generate identifying information based on detecting a beacon of an electronic device of the person, a Bluetooth sensor operable to generate identifying information based on detecting a Bluetooth Low-Energy beacon of an electronic device of a person, a fingerprint sensor operable to generate identifying information based on a person's fingerprints, or a biometric sensor operable to generate identifying information based on a person's biometric characteristics, or other sensor device. The sensor component 406 is configured to generate identifying information as the person enters a space in which the display device is viewable, and/or the sensor component 406 is configured to monitor the person and update the identifying information over time as the person remains in the space in which the display device is viewable.

In some implementations, the sensor component 406 includes an image sensor configured to capture an image of an area proximate the display component 402. The image can be used to identify persons viewing the display component 402 and can also be used to determine the orientation of a person, such as if the person is facing away from or towards the display component 402.

In some implementations, the sensor component 406 is configured to communicate with an access control system for the shared conference space, such that each time a person is granted access to the shared conference space, the access control system shares identifying information with the conference schedule system 400 by way of the sensor component 406 implementing an interface for communicating with the access control system. In some implementations, an access control system can use employee access cards/badges and NFC sensors to control access to the shared conference space. The employee access cards/badges can similarly be used to determine an identity of a person viewing the display component 402. For example, an NFC sensor located near the display component 402 may communicate with the conference schedule system 400 to provide identifying information in response to a person swiping or presenting their badge at the sensor. The conference schedule system 400 can then utilize the identifying information provided by the sensor to control the output of event information at the display device 402.

The control system component 404 implements software instructions for controlling the conference schedule system 400. The software instructions cause the display component 402 to display the schedule view 416 of the shared conference space digital schedule, which includes a selective output of event information, determine an identity of a person viewing the display component 402, and modify the selective output of event information displayed in the schedule view 416 dependent on the determined identity of the person viewing the display component 402. The software instructions include calendar software 418, graphical user interface (GUI) software 420, and identification software 422 The control system component 404 can include other software as needed to implement other functionality not listed in FIG. 4. In some instances, the software can be combined or separated into other software that performs the described functionality.

The calendar software 418 is configured to access a shared conference space digital calendar and generate information for displaying the schedule view 416 of the shared conference space digital calendar dependent on permission information for events displayed in the schedule view 416, and an identity of a person viewing the display component 402. The calendar software 418 outputs the information for displaying the schedule view 416 to the GUI software to implement the display of the schedule view 416 at the display component 402.

The calendar software 418 enforces permissions when generating the information for displaying the schedule view 416 so that event information is only included in the schedule view 416 if the permissions allow a person viewing the display component 402 to view the event information. For example, in some implementations, event permissions indicate a default viewing permission, individual viewer permissions, and group permissions. In such implementations, the calendar software 418 generates information for displaying the schedule view 416, including default event information in accordance with the default permissions. If no identity of a person viewing the display component 402 is determined (i.e., no one is present or a person is not recognized), the conference schedule system 400 displays the default schedule view 416 at the display component 402 using the default permissions. When the conference schedule system 400 determines the identity of a person viewing the display component 402, the calendar software 418 generates updated information for displaying the schedule view 416 including updated event information in accordance with permissions associated with the identified person or a group that the identified person is a member of. In some implementations, an event has multiple fields of information that can each have individual permissions.

For example, an event can have a default permission of private for all event information fields and other permissions that allow a particular person or member of a particular group to view all event information fields. When the conference schedule system 400 does not determine the identity of a person viewing the display component 402, the schedule view 416 would indicate that an event is taking place in the associated time block but would give no further information. If the conference schedule system 400 identifies that the particular person is viewing the display component 402 or that a member of the particular group is viewing the display component 402, the calendar software 418 generates information for displaying the schedule view 416 that includes additional event information including the fields allowed by the permissions. Other permissions are possible as shown in the following example table that lists example permissions that can be enforced by the calendar software 418:

| Event Information Field | Default | First User Perm. | Second User Perm. | Group Perm. | Result |
|---|---|---|---|---|---|
| View Event Name | N | Y | Y | Y | By default, a title of the event is not shown in the schedule view, but a first user, a second user, and members of a group of users can view the title of the event in the schedule view. |
| View Event Summary | N | Y | N | N | By default, a summary of the event is not shown in the schedule view, but the first user is able to view the summary of the event, while the second user, and members of the group of users are not able to view the summary. |
| View Event Participants | N | Y | Y | N | By default, the participants for the event are not shown in the schedule view, but the first user and the second user are able to view the participants of the event, while members of the group of users are not able to view the participants. |

The permissions demonstrated in the above table would be appropriate for an event that an event organizer would prefer to remain private for most persons but be visible for members of a group. The members of the group can correspond to people invited to the event in the shared conference space. Thus, by default, there is no event information displayed in the schedule view 416 of the display component 402. If a person other than a member of the group, the first user, or the second user, views the schedule view 416, the event name, event description, and event participants will not be displayed. However, the permissions allow the first user, such as the event organizer, to view all of the event information, a second user, such as the first user's assistant, to view the event name and participants invited to the event, and a member of a group, such as invited guests to view the title and the participant. Thus, the dynamic information in the schedule view 416 provides each person with an appropriate amount of information about the event based on the person's identity as determined by the conference schedule system 400.

The following table lists another example of permissions that can be enforced by the calendar software 418:

| Event Permissions | Default | First User | Second User | Group | Result |
|---|---|---|---|---|---|
| View Event Name | Y | Y | Y | Y | By default, all users may view the title of the event. |
| View Event Description | N | Y | N | Y | Only the first user and group members are able to view the summary of the event. |
| View Event Participants | N | Y | Y | Y | The first user, the second user, and group members are able to view the participants of the event. |

The permissions shown in the above table may be appropriate for an event that an event organizer has decided does not require as much privacy as the previously described event. By default, the calendar software generates information for displaying the schedule view 416, including the title of the event. Thus, the event name is always available to a person, but not the event summary or identification of the invited guests. When the conference schedule system 400 determines that the identity of a person viewing the display component 402 is the first user (e.g., the event organizer), the second user (e.g., the event organizer's assistant), or a member of the group (e.g., invited guests) the calendar software 418 will display additional event information. For example, in response to determining the first user is viewing the display component 402 or that a member of the group is viewing the display component 402, the calendar software 418 will generate information for displaying the schedule view 416 including the event title, the event summary, and a list of the invited guests. Or, in response to determining that the second user is viewing the display component 402, the calendar software 418 will generate information for displaying the schedule view 416, including the event name and the list of invited guests but omit the event summary. Thus, the conference schedule system 400 provides each person with an appropriate amount of information about the event based on the person's identity, as determined by the conference schedule system 400 and the permissions for the event.

The permissions shown above are event specific, but other types of permissions are possible. In other implementations, a shared conference space can have additional permissions for viewing events scheduled at the shared conference space in addition to the per event permissions. For example, a shared conference space can have a permission to allow a person, such as a manager, to view all information about events scheduled in the shared conference space. Thus, in this example, the manager would be able to view events scheduled for the shared conference space even if an event organizer does explicitly grant the manager a permission for viewing all of the event information.

The identification software 422 is configured to determine the identity of a person viewing the display component 402 using identifying information provided by the sensor component 406. The identification software 422 uses the identifying information to identify the person viewing the display component 4012, either using an external software service or locally using techniques such as facial recognition, pattern recognition, voice recognition, unique identifiers, and other techniques. For instance, employees or other groups of people can submit identifying samples, such as fingerprints, photographs, sound samples, digital images, and other identifying information. The identification software 422 associates an identifying sample with the identity of a person. The identification software 422 then identifies persons by comparing or otherwise evaluating identifying information received from the sensor component 406 with the identifying samples. In some instances, identifying samples can be retrieved from other data sources, such as publicly shared social media information, security system sensors, and/or other information.

The GUI software 420 is configured to provide an interface between the conference schedule system 400 and a person viewing the display component 402. The GUI software 420 controls the output of the display component 402 and captures input from a person, either from the display component 402 or a separate user input device. In some instances, the display component 402 is an interactive display combining a touch input and a display, or in other instances, input is provided by a separate input device. The display component 402 and the GUI software 420 implement controls for receiving inputs from the user input devices. The GUI software generates data for displaying the schedule view 416 of the shared conference space digital calendar and user interface (UI) elements for interacting with the conference schedule system 400. The UI elements can provide functions to a user, such as scrolling the schedule view 416 and selection of UI elements. Examples of the schedule view 416 will be further described in relation to FIGS. 8-12.

In some implementations, the control system component 404 communicates with an external server 410 and/or an external data source 414 by way of network 412 to implement the conference schedule system 400. For example, in some implementations the control system component 404 can access the external data source 414 to obtain identifying samples to identify a person, send identifying information received from the sensor component 406 to an identification software service provided by the external server 410 to identify a person, access a shared conference space digital calendar stored at the external data source 414, and/or access a shared conference space digital calendar provided by a calendar software service of the external server 410.

In some instances, the components of the conference schedule system 400 are integrated in a single housing. For example, a kiosk console can include the display component 402, the sensor component 406, and the control system component 404. In other instances, the components of the conference schedule system 400 are distributed in multiple devices having separate housings. For example, the display component 402 can be a display device separate from a computer console implementing the control system component 404, and a sensor component 406 can be an image device separate from both the control system component 404 and the display component 402.

Other components may be included in the conference schedule system 400 and examples are not limited to the components shown in FIG. 4. For example, the conference schedule system 400 can be integrated with a UCaaS platform such as the software platform 300 of FIG. 3 and include conferencing devices such as video devices, audio devices, interactive whiteboards, and video conference displays. In some instances, the conference schedule system 400 can include additional functionality corresponding to a client such as one of clients 104A-D of FIG. 1 and/or one of the clients 304-310 of FIG. 3.

The conference schedule system 400 makes use of the display component 402, the control system component 404, and the sensor component 406 to implement automated privacy controls for a schedule view 416 of the shared conference space digital calendar. The display component 402 displays a schedule view 416 of the shared conference space digital calendar with a selective output of event information as determined by the control system component 404 based on permissions associated with the shared conference space digital calendar. The sensor component 406 captures identifying information of people viewing the display component 402 and sends the identifying information to the control system component 404. The control system component 404 makes use of the identifying information to determine the identity of a person viewing the display component 402 and modifies the selective output of event information to account for the identity of the person and the permissions associated with the shared conference space digital calendar. The control system component 404 then causes the display component 402 to display the schedule view 416 with the modified selective output of event information. In this manner, the conference schedule system 400 is able to output a schedule view 416 of the shared conference space digital calendar with automated privacy controls based on the identity of a person viewing the display component 402.

Figure 5:
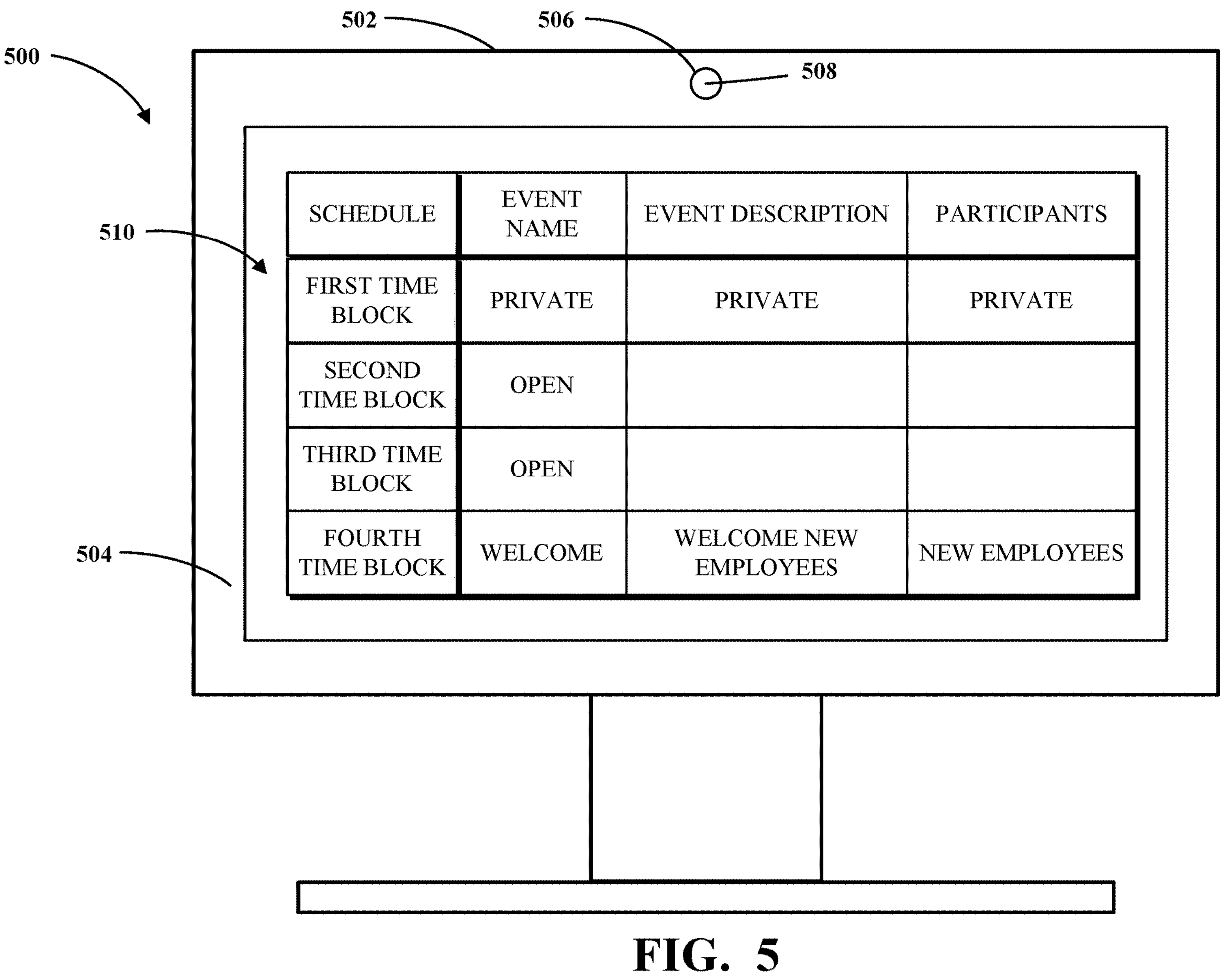
FIG. 5 is an example of a conference schedule system for implementing automated privacy controls for a schedule view of a shared conference space digital calendar integrated in a single housing.

FIG. 5 is an illustration of an example of a conference schedule system 500 for implementing automated privacy controls for a schedule view 510 of a shared conference space digital calendar integrated in a single housing 502. The conference schedule system 500 may, for example, be the conference schedule system 400 shown in FIG. 4. The single housing 502 represents a single, enclosed unit which includes the functionality and/or structure of the conference schedule system 500 (e.g., the functionality and/or structure of or otherwise similar to that of the conference schedule system 400). The example conference schedule system 500 can be located within a shared conference space and configured to allow for conference participants to interact with the conference schedule system 500. In some implementations, the conference schedule system 500 can be located on a tabletop in the shared conference space or, in other implementations, the conference schedule system can be mounted to a wall of the shared conference space. Conference participants can interact with the conference schedule system 500 through a touch screen to select items and register inputs to perform functions, such as scrolling or zooming the schedule view. In other instances, a conference participant can interact with the conference schedule system 500 using an external input device, such as a keyboard or a mouse.

The conference schedule system 500 includes a display component 504, sensor component 506, and control system (not visible) in the single housing 502, which may, for example, respectively be or otherwise have functionality and/or structure similar to that of the display component 402, the sensor component 406, and the control system 404 shown in FIG. 4. As described in relation to FIG. 4, the display component 504 is configured to display a schedule view 510 of a shared conference space digital calendar associated with the shared conference space, the sensor component 506 is configured to capture identifying information of people viewing the display component 504, and the control system is configured to determine the identity of the person viewing the display component 504 and dynamically update the schedule view 510 based on the identity of the person. In the example of FIG. 5, the conference schedule system 500 implements the sensor component 506 in the form of an image sensor 508. The image sensor 508 captures images of people viewing the display component 504. In some implementations, the conference schedule system 500 includes additional image sensors at other locations to capture images of people that are obscured by other objects. For instance, an additional image sensor can be located to the side of the single housing 502 to capture images of people that are obscured by a person directly in front of the display component 504. The conference schedule system 500 uses the image data captured by the image sensor 508 to determine the identity of people viewing the display component 504.

The conference schedule system 500 is depicted as having an image sensor 508 for generating identifying information for determining the identities of the persons viewing the display component 504, but other implementations can have other sensor types. In some implementations, the conference schedule system 500 can include other sensors such as a beacon detector for identifying a person by a beacon such as a Bluetooth Low-Energy beacon associated with a person's electronic device, a microphone for identifying a person by the sound of their voice, or a biometric sensor for identifying a person based on biometric information. In some implementations, the conference schedule system may require that a user provide identifying information before displaying the schedule view, or before displaying the schedule view with event information other than that provided in the default schedule view. In such implementations, the conference schedule system may use a Near Field Communication sensor to identify an electronic device associated with a person such as an employee access card or badge and identify the person based on the identity of the electronic device before displaying the schedule view to the person.

Figure 6:
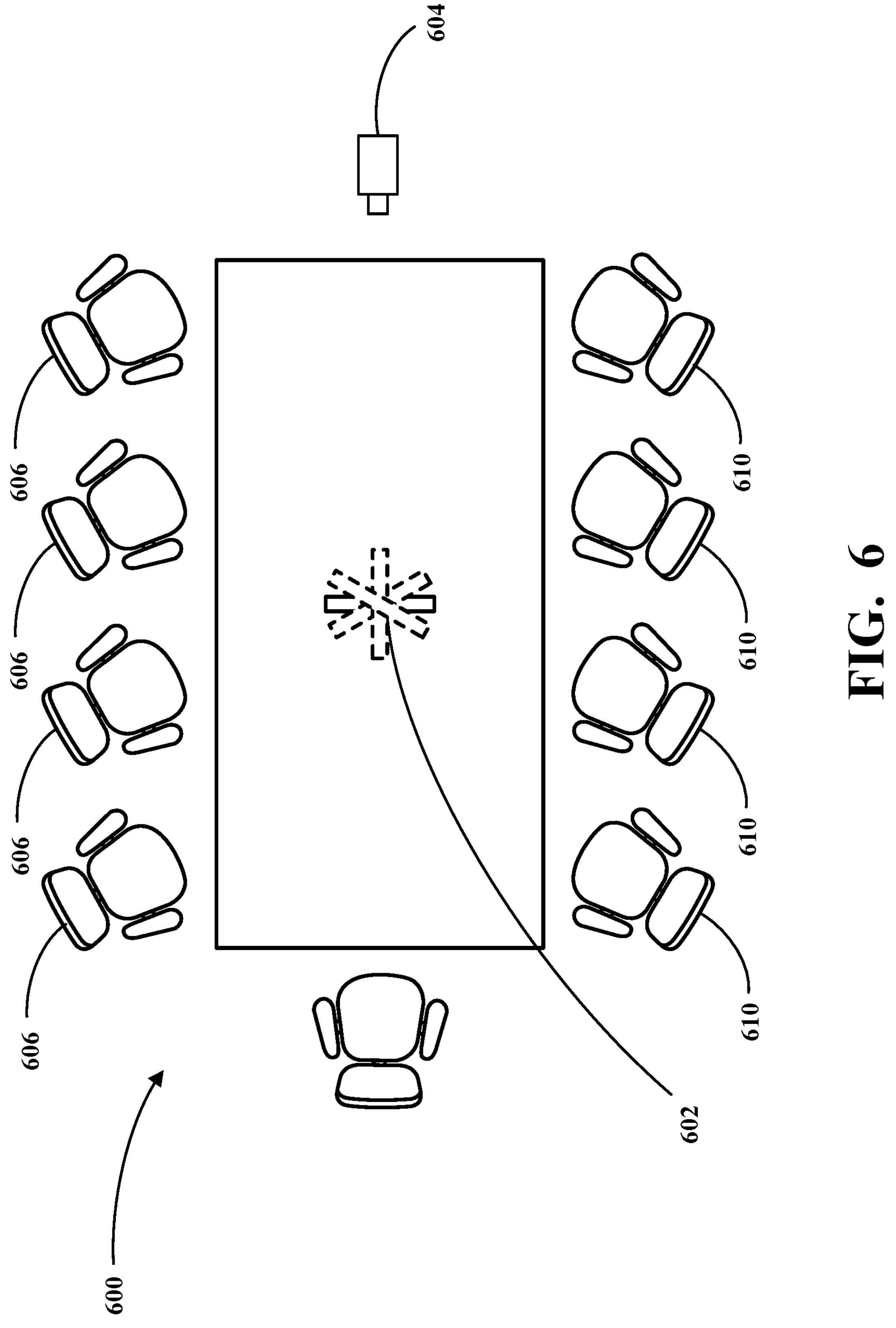
FIG. 6 is a top-down view of an example of a shared conference space including a conference schedule system for implementing automated privacy controls for a schedule view of a shared conference space digital calendar.

FIG. 6 is a top-down view of an example of a shared conference space 600 in which a conference schedule system (e.g., the conference schedule system 400 shown in FIG. 4) is used. Component of the conference schedule system are located within the shared conference space 600, including a display component 602, a sensor component 604, and a control component (not shown, but can in at least some cases be separate or integrated in either the display component 602 or the sensor component 604). For example, the display component 602, the sensor component 604, and the control component may respectively be the display component 402, the sensor component 406, and the control system 404 shown in FIG. 4. In some implementations, the display component 602 is configured to rotate to different orientations, with the different orientations being shown by the dashed outlines of the display component in FIG. 6, to be viewable by different people in the shared conference space. In contrast to the example of FIG. 5, in the example of FIG. 6, the sensor component 604 is located externally to the display component 602. However, the display component 602, sensor component 604, and control system component operate similarly to the components 502-506 of FIG. 5 to determine the identity of a person viewing the display component 602 and dynamically update a schedule view based on the person's identity.

The display component 602 in FIG. 6 is shown as being located on the top of a conference table, but in other implementations the display component 602 can be located in other areas in or nearby the shared conference space 600. For instance, the display component 602 can be mounted to a wall of the shared conference space 600 or the display component 602 can be mounted on a bracket and extend from a wall or ceiling of the shared conference space 600. In another implementation, the display component 602 can be flush mounted in a wall of the shared conference space 600. Other variations for locating the display component 602 are possible provided that a person is able to view a schedule view displayed at the display component 602.

In some implementations, the conference schedule system updates captured identifying information when the display component 602 is rotated or when movement is detected to identify new people viewing the display component 602. For instance, if the display component 602 is facing a first group of chairs 606, the conference schedule system can determine that people in the first group of chairs 606 are viewing the display component 602. In response, the conference schedule system determines the identities of the people in the first group of chairs 606 and updates the schedule view based on the identities of the people in the first group of chairs 606. If the sensor component 604 detects that the people are moving, the conference schedule system can then determine whether a new person moved into a position such that they are now viewing the display component 602. If a new person has entered a position such that they are viewing the display component 602, the conference schedule system identifies the new person based on identifying information captured by the sensor component 604 and updates the schedule view based on the identity of the new person. If the display component 602 is rotated, for example, to face people sitting in a second group of chairs 610, the conference schedule system can determine the identities of the people sitting in the second group of chairs 610 and update the schedule based on the identities of the people sitting in the second group of chairs 610.

Figure 7:
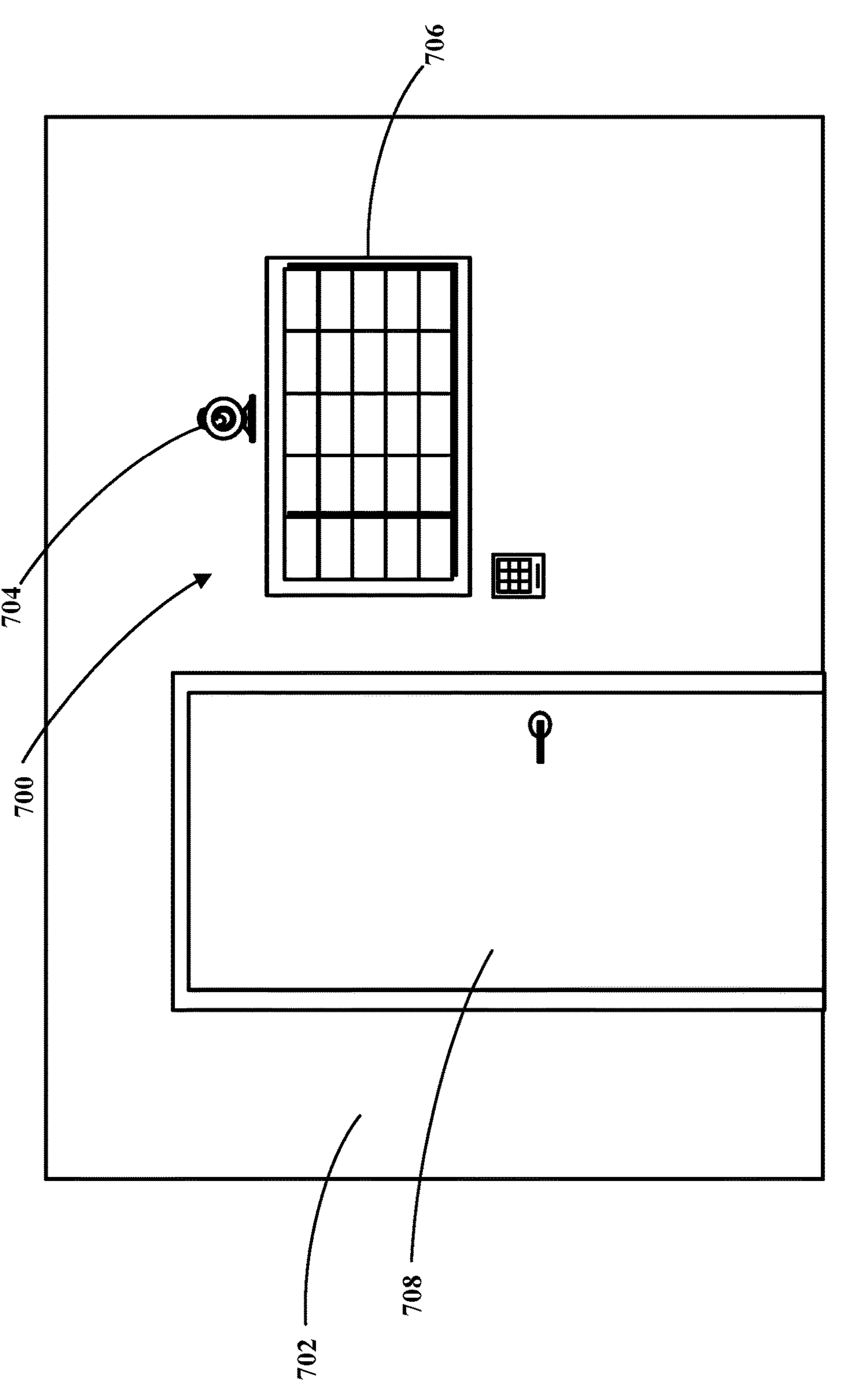
FIG. 7 is an example of an exterior of a shared conference space having an external shared conference space schedule view system for implementing automated privacy controls for a schedule view of a shared conference space digital calendar.

FIG. 7 illustrates an example of a wall 702 of a shared conference space (e.g., the shared conference space 600 shown in FIG. 6) having an external conference schedule system 700. The conference schedule system of FIG. 7 differs from the previously described conference schedule systems in that in the conference schedule system of FIG. 7, a sensor component 704 and a display component 706 (e.g., respectively, the sensor component 406 and the display component 402 shown in FIG. 4) are located externally to the shared conference space. In this implementation, the sensor component 704 and the display component 706 are mounted to the exterior of the wall 702 of the shared conference space adjacent a door 708 providing access to the shared conference space. In other implementations, the display component 706 can be located at locations remote to the shared conference space. For example, the display component 706 can be located in a hallway leading to the shared conference space or at an entrance to a building in which the shared conference space is located. The control component (not shown, but which may, for example, be the control system 404 shown in FIG. 4) can be integrated within the display component 706, or in other implementations can be located at another location such as within the shared conference space.

The display component 706 is configured to display a schedule view of the shared conference space digital calendar and the sensor component 704 is configured to generate identifying information as described in relation to FIG. 4. As a person approaches the display component 706, the sensor component 704 captures identifying information of the person and delivers the identifying information to the control system. The control system then determines the identity of the person based on the identifying information and updates the schedule view at the display component 706 to display event information based on shared conference space digital calendar permissions and the identity of the person viewing the display component 706.

FIGS. 8-12 are illustrations of examples of schedule views of a shared conference space digital calendar having automated privacy controls as viewed by different people having different permissions for viewing events in the schedule view. FIG. 8 is an example of a schedule view 800 of the shared conference space digital calendar as displayed at a display component of a conference schedule system with a default view (e.g., when no people viewing the display component have been identified), such as when no person has been identified viewing the display component. The schedule view 800 can be displayed at a display component of a conference schedule system, such as the conference schedule system described in any of FIGS. 4-7. With reference to the conference schedule system of FIG. 4 as an example, the display component 402 of the conference schedule system 400 is configured to display the schedule view 800 and the control system component 404 dynamically updates the schedule view 800 depending on the identity of a person viewing the display component 402. Other formats and schedule views are possible, and the schedule view of FIGS. 8-12 are merely possible implementations.

The schedule view 800 includes a name 802 of the shared conference space, a column of time blocks 804A-804D (referred to generically as a time block 804), an event name column 806, an event description column 808, and an event participant heading column 810. Each time block 804 forms a row containing an event name field (collectively referred to as event name fields 812), an event description field (collectively referred to as event description fields 814), and an event participant field (collectively referred to as event participant fields 816) for an event occurring during a respective time block 804. If no event occurs during a time block 804, the fields can be blank.

The event name field 812 contains the name of the event scheduled at the shared conference space; the event organizer can enter the name of the event at the time the event organizer schedules the event. The event description field 814 contains an event description as entered by the event organizer at the time the event organizer schedules the event. The event description field 814 can include information about the event, such as a summary of a planned discussion, an agenda, a description of activities taking place in the event, or other information as input by the event organizer when scheduling the event. The event participant field 816 contains a list of people invited to the event. The list can display names of people, job titles, or other identifying information of the people invited to the event. Other event information fields are possible, and implementations are not limited to these particular fields shown in this example. Similarly, although four time blocks 804 are shown, more or fewer time blocks can be shown in other implementations. Additionally, the time blocks 804 can be of varying lengths and the events do not need to correspond to a single time block.

In the following description, references will be made to various people to demonstrate implementations of the automated privacy controls for a schedule view of a shared conference space digital calendar. Implementations are not limited to the specified individuals and permissions, as they are explanatory examples. An event organizer can create an event with different permissions for different people and for different reasons than those given in the examples.

In the example of FIG. 8, the shared conference space digital calendar includes permissions for an event occurring in the first time block 804A that indicate that the event information is private by default, that the event name field 812A is viewable to a visiting executive and to persons belonging to an executive group, that the event description field 814A is viewable to the visiting executive and to the persons belonging to the executive group, and the participants are viewable by the persons belonging to the executive group. Thus, unless a person identified by the shared conference space digital calendar is either the visiting executive or a member of the executive group, the schedule view 800 does not display an event name field 812A, an event description field 814A, or the event participant field 816A for the event scheduled in the first time block 804A. In some implementations, the first time block 804A is marked as being in use to notify people that the shared conference space is not available during the first time block 804A.

The shared conference space digital calendar includes permissions for an event occurring in the second time block 804B that indicate that the event name field 812B is to be displayed for everyone, the remaining information fields are private, a group of people invited to the event and members of a human resources group can view the event description field 814B, and members of the human resources group can view the event participant field 816B. Thus, the schedule view 800 by default includes the name of the event that is occurring during the second time block 804B, but not the event description field 814B or the event participant field 816B.

The shared conference space digital calendar includes permissions for an event occurring in the third time block 804C that indicate that all event information fields can be displayed and thus, by default, the schedule view 800 includes all of the event information field 812C, 814C, and 8146C.

The shared conference space digital calendar includes permissions for an event occurring in the fourth time block 804D that indicate that event name field 812D and the event participant field 816D are to be displayed but the event description field 814D is private and that members of the human resources group can view the event description field 814D. Thus, the schedule view 800 displays the event name field 812D and the event participant field 816D for the event occurring in the fourth time block 804D.

In addition to the per event permissions, the shared conference space digital calendar includes a shared conference space permission that indicates that non-employees are not allowed to view any event information unless an event grants them permissions. For example, the visiting executive is not an employee and therefore is not allowed to view any event information in the schedule view 800. However, because the shared conference space digital calendar includes permissions allowing the visiting executive to view the event name field 812A for the event scheduled in the first time block 804A and the event descriptions field 814A for the event scheduled in the first time block 804A, the schedule view 800 will show the event name field 812A and the event description field 814A for the event scheduled in the first time block 804A to the visiting executive. The shared conference space digital calendar further includes a shared conference space permission that indicates that members of the executive group are allowed to view all event information.

The schedule view 800 of FIG. 8 is an example of how a schedule view 800 appears when the conference schedule system has not identified any people viewing the display component of the conference schedule system. For example, the schedule view 800 of FIG. 8 can be displayed when no one is viewing the display or if a person viewing the display is not recognized by the conference schedule system.

FIG. 9 is an example of a schedule view 900 of the shared conference space digital calendar as displayed at a display component of a conference schedule system after the conference schedule system has determined the identity of a person viewing the display component. In this example, the conference schedule system has determined that the person viewing the display component is a new employee invited to the event in the second time block 804B. The conference schedule system dynamically updates the schedule view 900 based on the person's identity and the permissions of each event in the schedule view 900.

The new employee does not have any additional permissions for the event scheduled in the first time block 804A, the event scheduled in the third time block 804C, or the event scheduled in the fourth time block 804D, and the schedule view 900 remains the same for the first time block 804A, the third time block 804C, and the fourth time block 804D. However, the event scheduled for the second time block 804B has a permission that allows people invited to the second event, which includes the new employee, to view the event description field 814B for the event scheduled for the second time block 804B. Thus, the schedule view 900 is updated to display the event description field 814B to the new employee in response to the conference schedule system determining the identity of the new employee viewing the display component.

FIG. 10 is an example of a schedule view 1000 of the shared conference space digital calendar as displayed when the conference schedule system determines that a human resources manager that is a member of the human resources group is viewing the display component. The human resource manager does not have any permissions to view the event in the first time block 804A or the event in the third time block 804C, so the schedule view 1000 does not display any additional information for the first time block 804A or the third time block 804C. However, the permissions allow the human resource manager to view the event details for the event occurring during the second time block 804B, including the event description field 814B and the event participant field 816B. The permissions also allow the human resource manager to view the event details for the event occurring during the fourth time block 804D, including the event description field 814D and event participant field 816D. Thus, the conference schedule system dynamically updates the schedule view 1000 to include the event description field 814B and the event participant field 816B for the event occurring during the second time block 804B and the event occurring during the fourth time block 804D in response to determining that the human resource manager is viewing the display component, as shown in the schedule view 1000 of FIG. 10.

FIG. 11 is an example of a schedule view 1100 of the shared conference space digital calendar as displayed when the conference schedule system determines that the visiting executive is viewing the display component. The visiting executive is not an employee and does not have permission to view any event information by default. However, the event in the first time block 804A has permissions that allow the visiting executive to view event information for the event occurring during the first time block 804A including the event name field 812A and the event description field 814A, but not the event participant field 816A. Thus, the event name field 812A and the event description field 814A for the event schedule in the first time block 804A are included in the schedule view 1100, while the remaining event information is not included in the schedule view 1100.

The conference schedule system dynamically updates the schedule view 1100 to include the event name field 812A and the event description field 814A for the event scheduled for the first time block 804A and removes the remaining event information from the schedule view 1100 in response to determining that the visiting executive is viewing the display component, as shown in the schedule view 1100 of FIG. 11.

In some instances, the visiting executive can give identifying information to the conference schedule system ahead of time so that the system can identify the executive using the sensor component. For example, the executive can have their picture taken when entering the building and the system can use the captured image to generate identifying information.

FIG. 12 is an example of a schedule view 1200 of the shared conference space digital calendar display as displayed when the conference schedule system determines that a member of the executive group is viewing the display component. In this example, the shared conference space digital calendar displays all available event information in response to determining that the person viewing the display component is a member of the executive group. Thus, the schedule view 1200 includes all event information fields for all of the events as shown in the example of FIG. 12.

Figure 13:
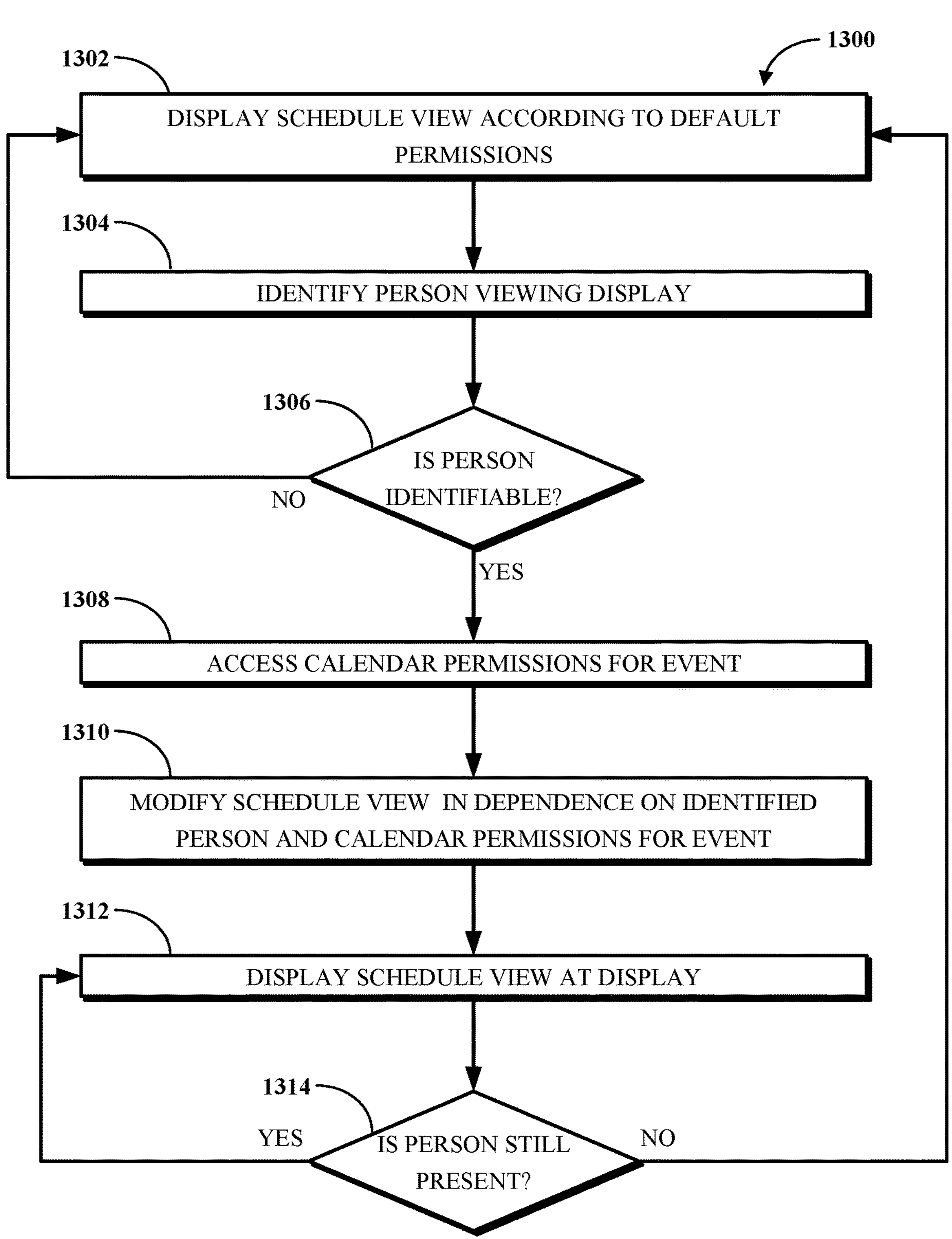
FIG. 13 is a flowchart of an example of a technique for automated privacy controls for a schedule view of a shared conference space digital calendar.

To further describe some implementations in greater detail, reference is next made to examples of techniques which may be performed by or using a conference schedule system for implementing automated privacy controls for a schedule view of a shared conference space digital calendar. FIG. 13 is a flowchart of an example of a technique 1300 for implementing automated privacy controls for a schedule view of a shared conference space digital calendar. The technique 1300 can be executed using computing devices, such as the systems, hardware, and software described with respect to FIGS. 1-12. The technique can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, the conference schedule system displays a schedule view of a shared conference space digital calendar according to default permissions. The conference schedule system can generate a schedule view using default permissions of the shared conference space, including default permissions for events in the schedule view and default permissions for the shared conference space digital calendar. For example, the shared conference space generates a selective output of event information that does not contain any event information that is not allowed by default by event permissions for each event in the schedule view or by the default permissions for the shared conference space. The conference schedule system then outputs the schedule view having the selective output of event information at a display screen.

At 1304, the conference schedule system determines the identity of a person viewing the display screen. The conference schedule system determines the identity of a person viewing the display by capturing identifying information of a person viewing the display and matching the identifying information to an identity. For example, a sensor component can capture identifying information and provide the identifying information to a control component for matching the identifying information with a person.

At 1306, the conference schedule system determines if the person viewing the display has been identified. If the system is unable to identify the person viewing the display, the technique returns to 1302. In the system identifies the person viewing the display, the technique moves on to 1306 in which the system accesses calendar permissions for an event in the schedule view. The conference schedule system determines that a person viewing the display has been identified by verifying if an identity matches the identifying information provided by the sensor component. If the shared conference space schedule view system does not determine an identity of the person viewing the display, the shared conference view system continues to display the schedule view with the selective event information according to the default view.

When the shared conference space schedule view system determines the identity of a person viewing the display, the technique advances to 1308, in which the conference schedule system access calendar permissions for the event. The calendar permissions can be stored as part of the shared conference space digital calendar. The shared conference space schedule view system accesses the permissions by reading the permissions in the shared conference space digital calendar or by reading external permissions associated with the shared conference space digital calendar. The permissions can identify people or groups of people that are allowed to view event information and/or people or groups of people that are not allowed to view event information for an event in the schedule view.

At 1310, the conference schedule system modifies the schedule view in dependence on the identified person and the calendar permissions. The conference schedule system can modify the schedule view by generating a selective output of event information including only information that the person identified by the conference schedule system is allowed to view based on the calendar permissions and generate the schedule view to include only the information that the person is allowed to view.

At 1312, the conference schedule system displays the schedule view at the display screen. Thus, the schedule view displayed at the display screen contains a selective output of event information that is dynamically updated based on the identity of the person viewing the display screen. The event information that is displayed will vary depending on the identity of the person viewing the display screen and the permissions for the event.

At 1314, the conference schedule system determines if the person is still present. If yes, the conference schedule system returns to 1312 and continues to display the schedule view. If no, the conference schedule system returns to 1302 and displays the schedule view according to the default permissions. The conference schedule system can determine if the person is still present using a sensor configured to determine the presence of a person. For example, a proximity sensor can be used to detect if a person is near the front of the display screen. The conference schedule system can also use the same sensor that captures identifying information to determine if the person is still present. If the sensor no longer captures identifying information, or the identifying information no longer matches the previously identified person, the conference schedule system can infer that the person is no longer present and update the schedule view to include a selective output of event information according to the default permissions.

Figure 14:
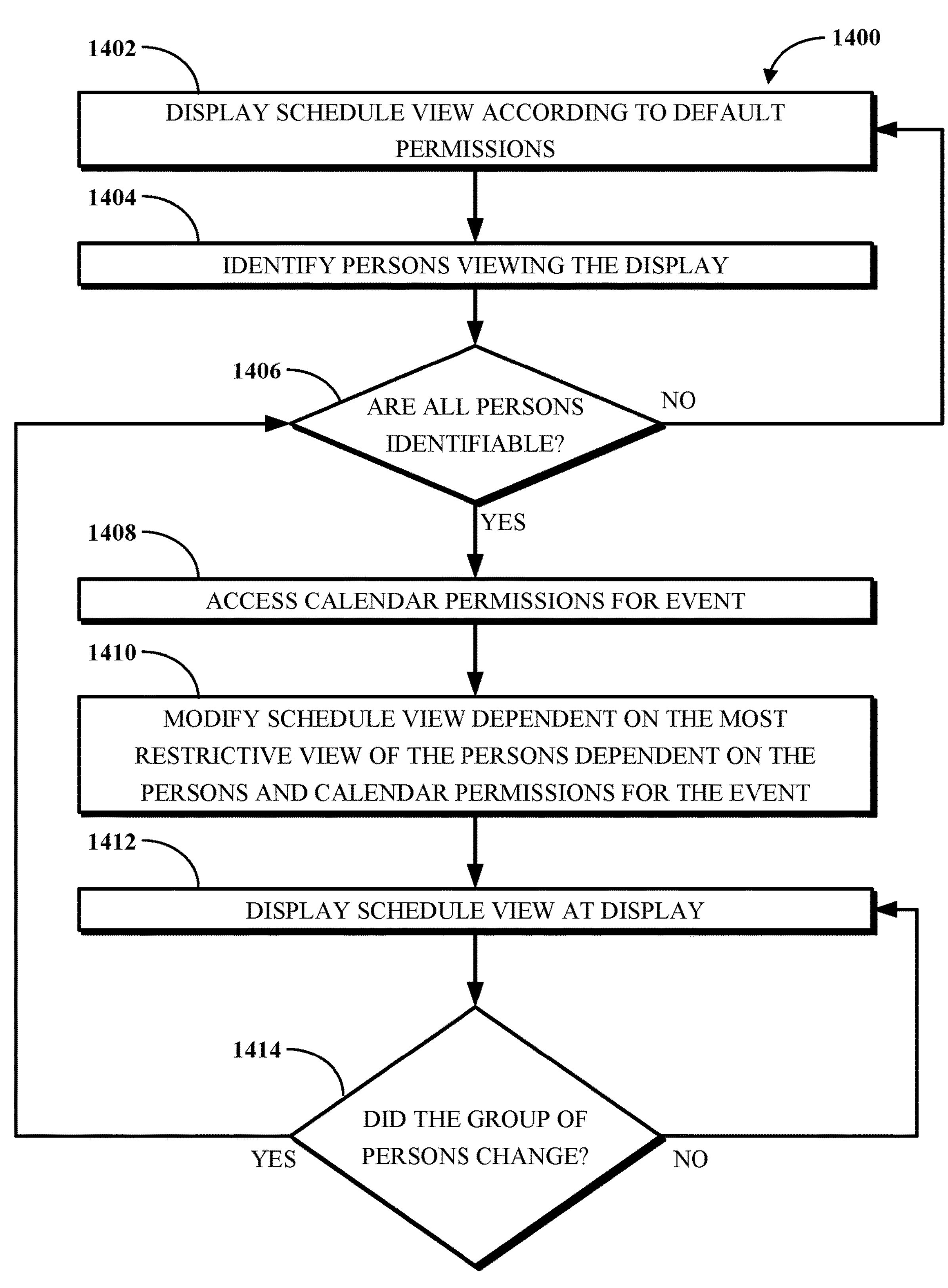
FIG. 14 is a flowchart of an example of a technique for automated privacy controls for a schedule view of a shared conference space digital calendar.

FIG. 14 is a flowchart of an example of a technique 1400 for implementing automated privacy controls for a schedule view of a shared conference space digital calendar. The technique 1400 can be executed using computing devices, such as the systems, hardware, and software described with respect to FIGS. 1-12. The technique can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof.

For simplicity of explanation, the technique 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1402, the conference schedule system displays a schedule view of a shared conference space digital calendar according to default permissions. The conference schedule system can generate a schedule view using default permissions of the shared conference space, including default permissions for events in the schedule view and default permissions for the shared conference space digital calendar. For example, the shared conference space generates a selective output of event information that does not contain any event information that is not allowed by default by event permissions for each event in the schedule view or by the default permissions for the shared conference space. The conference schedule system then outputs the schedule view having the selective output of event information at a display screen.

At 1404, the conference schedule system determines the identity of persons viewing the display screen. The conference schedule system determines the identity of the persons viewing the display screen by capturing identifying information of each person viewing the display screen and matching the identifying information to an identity for each person. For example, a sensor component can capture identifying information and provide the identifying information to a control component for matching the identifying information with a person.

At 1406, the conference schedule system determines if any of the persons viewing the display screen have not been identified. If the system is unable to identify one of the persons viewing the display screen, the technique returns to 1402. If the system determines that all of the persons viewing the display screen have been identified, the technique moves on to 1406 in which the system accesses calendar permissions for an event in the schedule view. In some implementations, the conference schedule system can determine that all of the persons viewing the display screen have been identified by verifying that an identity has been determined for all identifying information provided by the sensor component. For example, an image sensor can detect and count a quantity of faces viewing the display screen. If the number of identities determined by the conference schedule system is less than the number of faces detected, the conference schedule system can infer that not all of the people viewing the display screen have been identified. In some implementations, the control system component may generate an error if a person cannot be identified using identifying information provided by a sensor component. The conference schedule system can use the error generated by the control system component to infer that at least one of the people viewing the display has not been identified. If the conference schedule system determines that not all of the people viewing the display screen have been identified, the conference schedule system continues to display the schedule view with the selective event information according to the default view.

When the conference schedule system determines that the identity of all persons viewing the display screen have been determined, the technique advances to 1408, in which the conference schedule system accesses calendar permissions for the event. The calendar permissions can be stored as part of the shared conference space digital calendar. The conference schedule system accesses the calendar permissions by reading the calendar permissions in the shared conference space digital calendar or by reading external calendar permissions associated with the shared conference space digital calendar. The calendar permissions can identify people or groups of people that are allowed to view event information and/or people or groups of people that are not allowed to view event information for an event in the schedule view.

At 1410, the conference schedule system modifies the schedule view based on the most restrictive view for a person of the group of people viewing the display screen dependent on the identity of each person and the calendar permissions. The conference schedule system can modify the schedule view by generating a selective output of event information including only information that the person having the most restricted view is allowed to view based on the calendar permissions and the identities of the people viewing the display screen. In other words, the schedule view will only include event information if each person viewing the display has the required permission to view the event information. If one of the persons viewing the display screen does not have permission to view the information for an event, the event information is not included in the schedule view.

At 1412, the conference schedule system displays the schedule view at the display screen. Thus, the schedule view displayed at the display screen contains a selective output of event information that is dynamically updated based on the identities of the people viewing the display screen. The schedule view does not display any information that a person viewing the display screen is not permitted to view, even if a person allowed to view the information is present with the other persons. The event information that is displayed will vary depending on the identity of the persons viewing the display and the permissions for the event.

At 1414, the conference schedule system determines if the group of persons has changed. If yes, the conference schedule system returns to 1406 and determines if all the people viewing the display screen are identifiable. If no, the conference schedule system returns to 1412 and continues to display the schedule view at the display screen. The conference schedule system can determine if the group of persons viewing the display has changed using the same sensor that captures identifying information. For example, if the sensor captures identifying information that matches a new person, no longer matches a person that was previously identified, or is unable to match a person to at least some of the identifying information, the conference schedule system can infer that the person is no longer present and update the schedule view to include a selective output of event information according to the default permissions.

The implementations of this disclosure correspond to methods, non-transitory computer readable media, apparatuses, systems, devices, and the like. In some implementations, a method comprises determining, by a conference schedule system based on identifying information captured by a sensor associated with the conference schedule system, an identity of a person viewing a display screen configured to display a schedule view of a digital calendar associated with a shared conference space; accessing, by the conference schedule system, event permissions associated with an event scheduled for the shared conference space; and modifying, by the conference schedule system, a selective output of information associated with the event in the schedule view displayed at the display screen based on the event permissions and the identity of the person. In some implementations, an apparatus comprises a sensor configured to capture identifying information; a display screen configured to display a schedule view of a digital calendar associated with a shared conference space; a memory; and a processor configured to execute instructions stored in the memory to determine, using identifying information captured by the sensor, an identity of a person viewing the display screen configured to display a schedule view of a digital calendar associated with a shared conference space; access event permissions associated with an event scheduled for the shared conference space; and modify a selective output of information associated with the event in the schedule view displayed at the display screen based on the event permissions and the identity of the person. In some implementations, a non-transitory computer readable medium stores instructions operable to cause one or more processors to perform operations comprising determining, by a conference schedule system using identifying information captured by a sensor, an identity of a person viewing a display screen configured to display a schedule view of a digital calendar associated with a shared conference space; accessing, by the conference schedule system, event permissions associated with an event scheduled for the shared conference space; and modifying, by the conference schedule system, a selective output of information associated with the event in the schedule view displayed at the display screen based on the event permissions and the identity of the person.

In some implementations of the method, non-transitory computer readable medium, or apparatus, the identity of the person is determined by at least one of facial recognition of the person, a Bluetooth Low-Energy beacon associated with the person, Near Field Communication with a device associated with the person, voice recognition of the person, or biometric information of the person.

In some implementations of the method, non-transitory computer readable medium, or apparatus, the event permissions comprise an event information field and a permission for the event information field specifying persons allowed to view the event information field.

In some implementations of the method, non-transitory computer readable medium, or apparatus, the method comprises, the operations comprise, or the processor is configured to execute the instructions for determining, by the sensor, the identity of a second person viewing the display screen; and modifying, by the conference schedule system, a selective output of information associated with the event in the schedule view displayed at the display screen based on the identity of the second person, wherein the event permissions indicate that the second person has more restrictive permissions to view event information than the person viewing the display screen.

In some implementations of the method, non-transitory computer readable medium, or apparatus, the event permissions include a default permission, and the method comprises, the operations comprise, or the processor is configured to execute the instructions for determining, by the conference schedule system, that a second person viewing the display screen is not recognized; and modifying, by the conference schedule system, a selective output of information associated with the event in the schedule view displayed at the display screen based on the default permission.

In some implementations of the method, non-transitory computer readable medium, or apparatus, determining an identity of the person comprises detecting, using the sensor, an identity of a device associated with the person; and determining, by the conference schedule system, the identity of the person based on the detected device.

In some implementations of the method, non-transitory computer readable medium, or apparatus, the sensor comprises an image sensor, and the method comprises, the operations comprise, or the processor is configured to execute the instructions for capturing, by the image sensor, images of an area proximate the display screen of the conference schedule system; and detecting, using the images, that the person is orientated facing towards the display screen.

In some implementations of the method, non-transitory computer readable medium, or apparatus, the identifying information comprises image data and the identity of the person, is determined using facial recognition of the person.

In some implementations of the method, non-transitory computer readable medium, or apparatus, the information associated with the event comprises multiple event information fields and each event information has an associated permission specifying persons allowed to view the event information field.

In some implementations of the method, non-transitory computer readable medium, or apparatus, the method comprises, the operations comprise, or the processor is configured to execute the instructions for determining, using identifying information captured by the sensor, the identity of a second person viewing the display screen; and modifying the selective output of information associated with the event at the display screen to remove a portion of information previously included in the schedule view displayed at the display screen based on the event permissions and the identity of the second person.

In some implementations of the method, non-transitory computer readable medium, or apparatus, the event permissions include a default permission, and the method comprises, the operations comprise, or the processor is configured to execute the instructions for determining that no person is identified viewing the display screen; and modifying a selective output of information associated with the event in the schedule view displayed at the display screen based on the default permission.

In some implementations of the method, non-transitory computer readable medium, or apparatus, the method comprises, the operations comprise, or the processor is configured to execute the instructions for determining, using the sensor, that a person is viewing the display screen; and wherein determining an identity of a person viewing the display screen is performed in response to determining that a person is viewing the display screen.

In some implementations of the method, non-transitory computer readable medium, or apparatus, the sensor comprises an image sensor, and the method comprises, the operations comprise, or the processor is configured to execute the instructions for capturing, by the image sensor, images of an area in front of the display screen; and detecting, using the images, that the person can view the display screen.

In some implementations of the method, non-transitory computer readable medium, or apparatus, the shared conference space has associated shared conference space permissions, and the selective output of information is further based on the conference space permissions.

In some implementations of the method, non-transitory computer readable medium, or apparatus, the method comprises, the operations comprise, or the processor is configured to execute the instructions for determining, by the sensor associated with the conference schedule system, the identity of a second person viewing the display screen; and modifying, by the conference schedule system, a selective output of information associated with the event in the schedule view displayed at the display screen based on the identity of the person, wherein the event permissions indicate that the person viewing the display screen has more restrictive permissions to view event information than the second person.

In some implementations of the method, non-transitory computer readable medium, or apparatus, the event permissions include a default permission, and the method comprises, the operations comprise, or the processor is configured to execute the instructions for determining, by the conference schedule system, that a person is no longer viewing the display screen; and modifying, by the conference schedule system, a selective output of information associated with the event in the schedule view displayed at the display screen based on the default permission.

In some implementations of the method, non-transitory computer readable medium, or apparatus, determining an identity of the person comprises detecting, using the sensor, biometric identifying information of the person; and determining, by the conference schedule system, the identity of the person based on the biometric identifying information of the person.

In some implementations of the method, non-transitory computer readable medium, or apparatus, determining an identity of the person capturing, by the sensor, speech samples of the person viewing the display screen; and determining, by the conference schedule system, the identity of the person using voice recognition.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words “mechanism” and “component” are used broadly and are not limited to mechanical or physical implementations, but can include software routines in conjunction with processors, etc. Likewise, the terms “system” or “tool” as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

detecting, by a sensor associated with a conference schedule system, a first person within a field of view of a display screen configured to display a schedule view of a digital calendar associated with a shared conference space;

determining, by the conference schedule system based on identifying information captured by the sensor, an identity of the first person viewing the display screen;

accessing, by the conference schedule system, event permissions associated with an event scheduled for the shared conference space and permissions associated with the shared conference space, wherein the event permissions indicate visible event information based on the identity of the first person, and wherein the permissions associated with the shared conference space comprise a rule that overrides event permissions for non-employees;

displaying, at the display screen for the first person, the schedule view including a selective output of visible event information based on the event permissions for the identity of the first person and the permissions associated with the shared conference space;

determining, by the conference schedule system based on identifying information captured by the sensor, an identity of a second person viewing the display screen, wherein the second person is a non-employee;

modifying, by the conference schedule system, the selective output of visible event information based on the event permissions for the identity of the second person and the permissions associated with the shared conference space, wherein modifying the selective output of visible event information includes redacting an event summary;

determining, by the sensor, whether each person viewing the display screen is oriented facing towards the display screen;

in response to detecting that multiple persons are viewing the display screen, modifying the selective output of visible event information to display information that all identified persons are permitted to view, based on a highest restrictive event permission among the identified persons; and in response to determining that the second person is no longer present, reverting the selective output of visible event information to a default permission view that includes the event summary.

2. The method of claim 1, wherein the identity of the first person is determined by at least one of facial recognition of the first person, a Bluetooth Low-Energy beacon associated with the first person, Near Field Communication with a device associated with the first person, voice recognition of the first person, or biometric information of the first person.

3. The method of claim 1, wherein the event permissions comprise an event information field and a permission for the event information field specifying persons allowed to view the event information field.

4. The method of claim 1, wherein the event permissions indicate that the second person has more restrictive permissions to view visible event information than the first person.

5. The method of claim 1, wherein the event permissions include a default permission, the method further comprising:

determining, by the conference schedule system, that a third person viewing the display screen is not recognized; and modifying, by the conference schedule system, the selective output of visible event information based on the default permission.

6. The method of claim 1, wherein determining an identity of the first person comprises:

detecting, using the sensor, an identity of a device associated with the first person; and determining, by the conference schedule system, the identity of the first person based on the identity of the device.

7. The method of claim 1, wherein the sensor comprises an image sensor and the method further comprises:

capturing, by the image sensor, images of an area proximate the display screen of the conference schedule system; and detecting, using the images, that the first person is orientated facing towards the display screen.

8. An apparatus, comprising:

a display screen configured to display a schedule view of a digital calendar associated with a shared conference space;

a sensor configured to detect a first person within a field of view of the display screen;

a memory; and a processor configured to execute instructions stored in the memory to:

determine, based on identifying information captured by the sensor, an identity of the first person viewing the display screen;

access event permissions associated with an event scheduled for the shared conference space and permissions associated with the shared conference space, wherein the event permissions indicate visible event information based on the identity of the first person, and wherein the permissions associated with the shared conference space comprise a rule that overrides event permissions for non-employees;

display, at the display screen for the first person, the schedule view including a selective output of visible event information based on the event permissions for the identity of the first person and the permissions associated with the shared conference space;

determine, using identifying information captured by the sensor, an identity of a second person viewing the display screen, wherein the second person is a non-employee;

modify the selective output of visible event information based on the event permissions for the identity of the second person and the permissions associated with the shared conference space, wherein the selective output of visible event information modification includes a redaction of an event summary;

wherein the sensor is configured to determine whether each person viewing the display screen is oriented facing towards the display screen; and wherein the processor is configured to:

in response to a detection that multiple persons are viewing the display screen, modify the selective output of visible event information to display information that all identified persons are permitted to view, based on a highest restrictive event permission among the identified persons; and in response to a determination that a the second person is no longer present, revert the selective output of visible event information to a default permission view that includes the event summary.

9. The apparatus of claim 8, wherein the identifying information comprises image data and the identity of the first person is determined using facial recognition of the first person.

10. The apparatus of claim 8, wherein the visible event information comprises multiple event information fields and each event information field has an associated permission specifying persons allowed to view the event information field.

11. The apparatus of claim 8, wherein the processor is further configured to execute instructions stored in memory to:

determine, using identifying information captured by the sensor, the identity of a third person viewing the display screen; and modify the selective output of visible event information to remove a portion of information previously included in the schedule view displayed at the display screen based on the event permissions for the identity of the third person.

12. The apparatus of claim 8, wherein the event permissions include a default permission, and wherein the processor is further configured to execute instructions stored in memory to:

determine that no person is identified viewing the display screen; and modify the selective output of visible event information based on the default permission.

13. The apparatus of claim 8, wherein the processor is further configured to execute instructions stored in memory to:

determine, using the sensor, that the first person is viewing the display screen, wherein determining the identity of the first person viewing the display screen is performed in response to determining that a person is viewing the display screen.

14. The apparatus of claim 8, wherein the sensor comprises an image sensor and the processor is further configured to execute instructions stored in memory to:

capture, by the image sensor, images of an area in front of the display screen; and detect, using the images, that the first person can view the display screen.

15. A non-transitory computer readable medium storing instructions operable to cause one or more processors to perform operations comprising:

detecting, by a sensor associated with a conference schedule system, a first person within a field of view of a display screen configured to display a schedule view of a digital calendar associated with a shared conference space;

determining, by the conference schedule system based on identifying information captured by the sensor, an identity of the first person viewing the display screen;

accessing, by the conference schedule system, event permissions associated with an event scheduled for the shared conference space and permissions associated with the shared conference space, wherein the event permissions indicate visible event information based on the identity of the first person, and wherein the permissions associated with the shared conference space comprise a rule that overrides event permissions for non-employees;

displaying, at the display screen for the first person, the schedule view including a selective output of visible event information based on the event permissions for the identity of the first person and the permissions associated with the shared conference space;

determining, by the conference schedule system based on identifying information captured by the sensor, an identity of a second person viewing the display screen, wherein the second person is a non-employee;

modifying, by the conference schedule system, the selective output of visible event information based on the event permissions for the identity of the second person and the permissions associated with the shared conference space, wherein modifying the selective output of visible event information includes redacting an event summary;

determining, by the sensor, whether each person viewing the display screen is oriented facing towards the display screen;

in response to detecting that multiple persons are viewing the display screen, modifying the selective output of visible event information to display information that all identified persons are permitted to view, based on a highest restrictive event permission among the identified persons; and in response to determining that the second person is no longer present, reverting the selective output of visible event information to a default permission view that includes the event summary.

16. The non-transitory computer readable medium of claim 15, wherein the shared conference space has associated shared conference space permissions, and the selective output of visible event information is further based on the conference space permissions.

17. The non-transitory computer readable medium of claim 15, wherein the event permissions indicate that the first person viewing the display screen has more restrictive permissions to view visible event information than the second person.

18. The non-transitory computer readable medium of claim 15, wherein the event permissions include a default permission and wherein the instructions are further operable to cause the one or more processors to perform operations comprising:

determining, by the conference schedule system, that the first person is no longer viewing the display screen; and modifying, by the conference schedule system, the selective output of visible event information based on the default permission.

19. The non-transitory computer readable medium of claim 15, wherein determining an identity of the first person comprises:

detecting, using the sensor, biometric identifying information of the first person; and determining, by the conference schedule system, the identity of the first person based on the biometric identifying information of the first person.

20. The non-transitory computer readable medium of claim 15, wherein determining an identity of the first person comprises:

capturing, by the sensor, speech samples of the first person viewing the display screen; and determining, by the conference schedule system, the identity of the first person using voice recognition.

* * * * *